United States Patent
Perrin et al.

(10) Patent No.: US 8,874,510 B2
(45) Date of Patent: Oct. 28, 2014

(54) SYNCHRONIZING FILES BETWEEN BASE AND DETACHABLE DEVICE

(75) Inventors: Steven Richard Perrin, Raleigh, NC (US); Scott Edwards Kelso, Cary, NC (US); Bin Li, Beijing (CN); Sheng Wang, Beijing (CN)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 385 days.

(21) Appl. No.: 12/985,188

(22) Filed: Jan. 5, 2011

(65) Prior Publication Data

US 2012/0173484 A1 Jul. 5, 2012

(51) Int. Cl.
*G06F 17/00* (2006.01)
*G06F 7/00* (2006.01)
*G06F 17/30* (2006.01)

(52) U.S. Cl.
CPC ................................ *G06F 17/30174* (2013.01)
USPC .......................................... 707/617; 707/621

(58) Field of Classification Search
CPC .......... G06F 17/30174; G06F 11/2071; G06F 17/30575
USPC ................ 707/610, 611, 620, 621, 607, 609; 709/203, 217, 224, 230, 232, 248
See application file for complete search history.

(56) References Cited

U.S. PATENT DOCUMENTS

| | | | |
|---|---|---|---|
| 7,770,060 B2 * | 8/2010 | Blacquiere et al. | 714/6.13 |
| 7,899,443 B2 * | 3/2011 | Moran et al. | 455/413 |
| 8,103,786 B2 * | 1/2012 | Chapweske | 709/232 |
| 2005/0149481 A1 * | 7/2005 | Hesselink et al. | 707/1 |
| 2007/0168535 A1 * | 7/2007 | Ikonen et al. | 709/230 |
| 2009/0187917 A1 * | 7/2009 | Jang et al. | 719/313 |
| 2011/0010417 A1 * | 1/2011 | Yoshida | 709/203 |

* cited by examiner

*Primary Examiner* — Md. I Uddin
(74) *Attorney, Agent, or Firm* — Kunzler Law Group (57) ABSTRACT

An apparatus and method are disclosed for synchronizing states. A management module selects a file to synchronize between a base and a detachable device. The detachable device provides a display and a network connection for the base if the base and detachable device are connected. A synchronize module establishes a control connection and a data connection between the base and the detachable device and transmits the file to a memory space over the data connection in response to a command communicated over the control connection.

17 Claims, 6 Drawing Sheets

SYNCHRONIZING FILES BETWEEN BASE AND DETACHABLE DEVICE

FIELD

The subject matter disclosed herein relates to synchronizing files and more particularly relates to synchronizing files between a base and a detachable device.

BACKGROUND

Description of the Related Art

A computer system may incorporate a detachable device to allow a user to have access to limited computing functionality through the detachable device in a smaller, lighter, more transportable form factor. The detachable device may connect to a base of the computer system. Both the base and the detachable device may each include a processor, memory, and communications hardware.

When disconnected from the base, the detachable device may independently provide sufficient functionality to allow the user to access email and messaging accounts, view media content, access schedules, take notes, and perform other tasks.

When connected to the base, the user may use the detachable device along with a more extensive resource set available through the base such as a hard disk drive, an optical drive, a keyboard, Input/Output (I/O) ports, and the like.

The base may synchronize files with the detachable device so that the files are available on the detachable device when the detachable device is disconnected. However, a user may disconnect the detachable device from the base while synchronizing files, leaving partial, corrupted files on the detachable device that may later be synchronized back to the base.

BRIEF SUMMARY

Based on the foregoing discussion, the inventors have recognized a need for an apparatus and method that synchronizes files. Beneficially, such an apparatus and method would synchronize files between a base and a detachable device.

The embodiments of the present invention have been developed in response to the present state of the art, and in particular, in response to the problems and needs in the art that have not yet been fully solved by currently available file synchronizing methods. Accordingly, the embodiments have been developed to provide an apparatus and method for synchronizing files that overcome many or all of the above-discussed shortcomings in the art.

The apparatus for synchronizing files is provided with a plurality of modules configured to functionally execute the necessary steps of selecting a file, establishing a control connection, and transmitting the file. These modules in the described embodiments include a management module and a synchronize module.

The management module selects a file to synchronize between a base and a detachable device. The detachable device provides a display and a network connection for the base if the base and detachable device are connected. The synchronize module establishes a control connection and a data connection between the base and the detachable device and transmits the file to a memory space over the data connection in response to a command communicated over the control connection.

A method is also presented for synchronizing states. The method in the disclosed embodiments substantially includes the steps necessary to carry out the functions presented above with respect to the operation of the described apparatus. In one embodiment, the method includes selecting a file, establishing a control connection, and transmitting the file.

A management module selects a file to synchronize between a base and a detachable device. The detachable device provides a display and a network connection for the base if the base and detachable device are connected. A synchronize module establishes a control connection and a data connection between the base and the detachable device and transmits the file to a memory space over the data connection in response to a command communicated over the control connection.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable medium(s).

Any combination of one or more computer readable medium(s) may be utilized. The computer readable medium may be a computer readable signal medium or a computer readable storage medium. The computer readable medium may be a tangible computer readable storage medium storing the computer readable code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer readable program code embodied on a computer readable medium may be transmitted using any appropriate medium, including but not limited to wireless, wireline, optical fiber cable, Radio Frequency (RF), etc., or any suitable combination of the foregoing.

Computer readable program code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
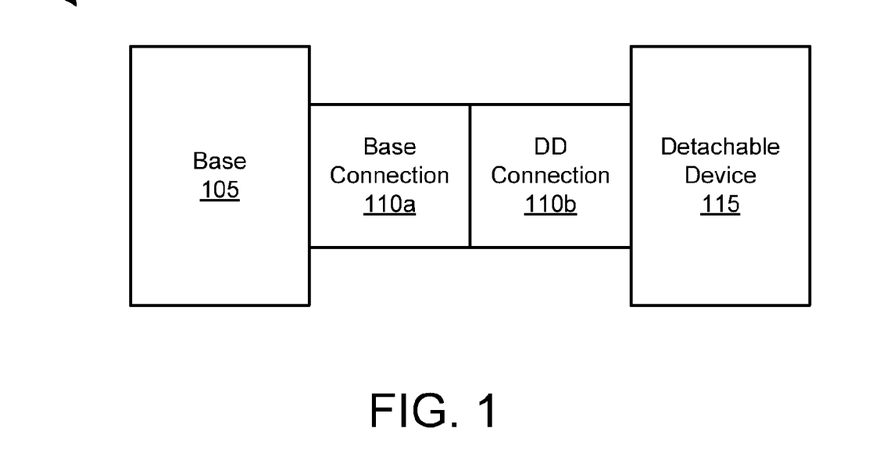
FIG. 1 is a schematic block diagram illustrating one embodiment of a computer system.

FIG. 1 is a schematic block diagram illustrating one embodiment of a computer system 100. The computer system 100 includes a base 105 and a detachable device 115. The base 105 connects to the detachable device 115 through connection 110 comprising a base connection 110a and a detachable device connection 110b. In one embodiment, the base connection 110a and the detachable device connection 110b are Universal Serial Bus (USB) connections. Alternatively, the base connection 110a and the detachable device connection 110b may be Institute of Electrical and Electronic Engineers (IEEE) 1394 interface (1394) connections, High-Definition, Multimedia Interface (HDMI) connections, custom serial bus connections, custom parallel bus connections, or the like.

In one embodiment, the detachable device 115 provides a display for the base 105 if the detachable device 115 and the base 105 are connected. In addition, the detachable device 115 may provide other functionality for the base 105. In a certain embodiment, the detachable device 115 provides a network connection.

The base 105 may provide additional resources for use with the detachable device. For example, the base 105 may include a mass storage device such as a hard disk drive, a micromechanical storage device, and optical storage device, a holographic storage device, and the like.

The base 105 may also provide additional input devices such as a keyboard, a mouse, a joystick, a game controller, and the like. In one embodiment, the base 105 includes additional I/O ports such as USB ports, 1394 ports, HDMI ports, external power supply ports, and the like.

In one embodiment, both the base 105 and the detachable device 115 include power sources such as batteries, fuel cells, and the like. In one embodiment, a power source of the base 105 may provide power to the detachable device 115 from a base power source when the base 105 and the detachable device 115 are connected. The detachable device 115 may use a device power source for power when disconnected from the base 105.

The base 105 may monitor the connection 110 between the base 105 and the detachable device 115. In addition, the detachable device 115 may also monitor the connection 110 between the base 105 and the detachable device 115. Thus the detachable device 115 is aware of a connection event such as the detachable device 115 disconnecting from the base 105 and the detachable device 115 connecting to the base 105. The base 105 is also aware of each connection event.

In one embodiment, the base 105 may execute one or more tasks. The base 105 may use a display of the detachable device 115 to interact with a user in performing the tasks. For example, the base 105 may execute a browser displaying a Universal Resource Locator (URL). The detachable device 115 may maintain a device task list of the tasks executed by the base 105. For example, the device task list may include the URL displayed by the browser.

If the detachable device 115 is disconnected from the base 205, the detachable device 115 may execute one or more tasks from the device task list. For example, the detachable device 115 may deploy the browser and display the URL from the device task list. In one embodiment, the detachable device 115 may display the device task list and the user may select which tasks are executed.

In a certain embodiment, the user may eject the detachable device 115 before disconnecting the detachable device 115 from the base 105. As used herein, eject refers to directing an operating system to close logical connections between the base 105 and the detachable device 115. If the user ejects the detachable device 115, the base 105 may update the device task list of the detachable device 115 with all executing tasks before completing the ejection of the detachable device 115. Alternatively, the detachable device 115 may receive an update of each base task to maintain a current device task list.

The base 105 and the detachable device 115 may each store instances of synchronized files. For example, a file may reside in a file system of the base 105 and a copy of the file may reside on the detachable device 115. If the file is modified by one device such as the base 105, the modified file may be transmitted to the other device such as the detachable device 115 to synchronize a latest version of the file between the base 105 and the detachable device 115.

If the user disconnects the detachable device 115 from the base 105 while the file is transmitted between the base 105 and the detachable device 115, the receiving device may only receive a partial, corrupted file copy. This disconnection during file transmission may occur if for example the user disconnects the detachable device 115 without ejecting the detachable device 115. The partial, corrupted file may then be used and even synchronized back to the original transmitting device, overwriting the valid instance of the file. The embodiments described herein synchronize files between the base 105 and the detachable device 115 while mitigating against incomplete transmissions of a file.

Figure 2:
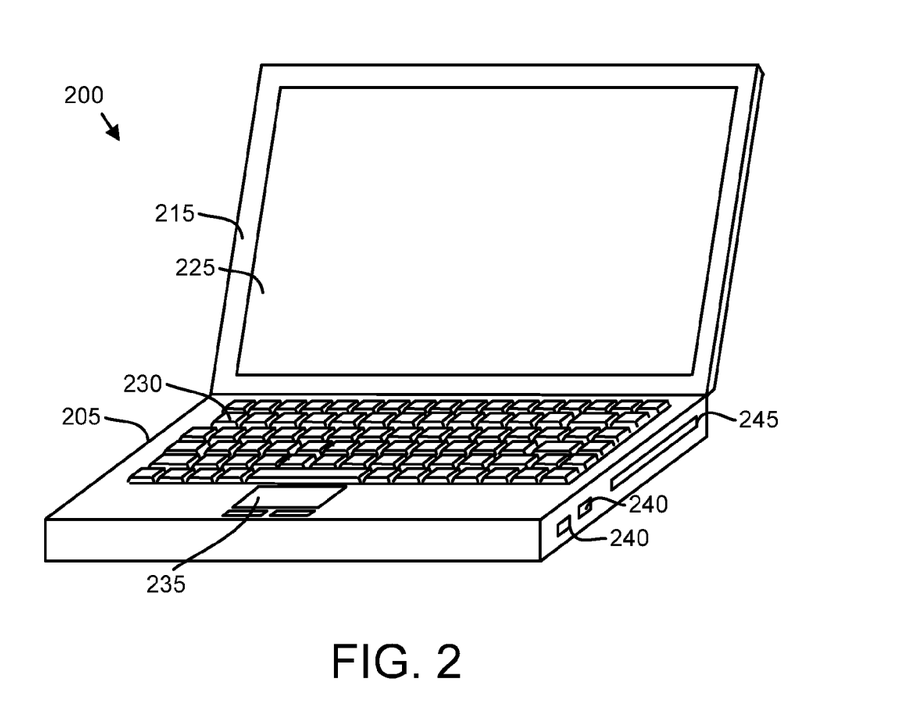
FIG. 2 is a perspective drawing illustrating one embodiment of a computer system.

FIG. 2 is a perspective drawing illustrating one embodiment of a computer system 200. The computer system 200 illustrates one embodiment of the computer system 100 of FIG. 1. In one embodiment, the computer system 200 is U1 hybrid notebook produced by Lenovo. The description of the computer system 200 refers to elements of FIG. 1, like numbers referring to like elements.

The computer system 200 includes a base 205 and a detachable device 215. The base 205 may be the base 105 of FIG. 1. In addition, the detachable device 215 may be the detachable device 115 of FIG. 1. The detachable device 215 is shown connected to the base 205. In the depicted embodiment, the base 205 includes a keyboard 230, a touchpad 235, I/O connections 240, and an optical drive 245. The I/O connections 240 may be USB connections, 1394 connections, HDMI connections, or the like.

When the detachable device 215 is connected to the base 205, the detachable device 215 may provide a display 225 for the base 205. In one embodiment, both the base 205 and the detachable device 215 include power sources such as batteries, fuel cells, and the like. In one embodiment, a power source of the base 205 may provide power to the detachable device 215 when the base 205 and the detachable device 215 are connected. Alternatively, both the power source of the base 205 and the power source of the detachable device 215 may be used concurrently.

Figure 3:
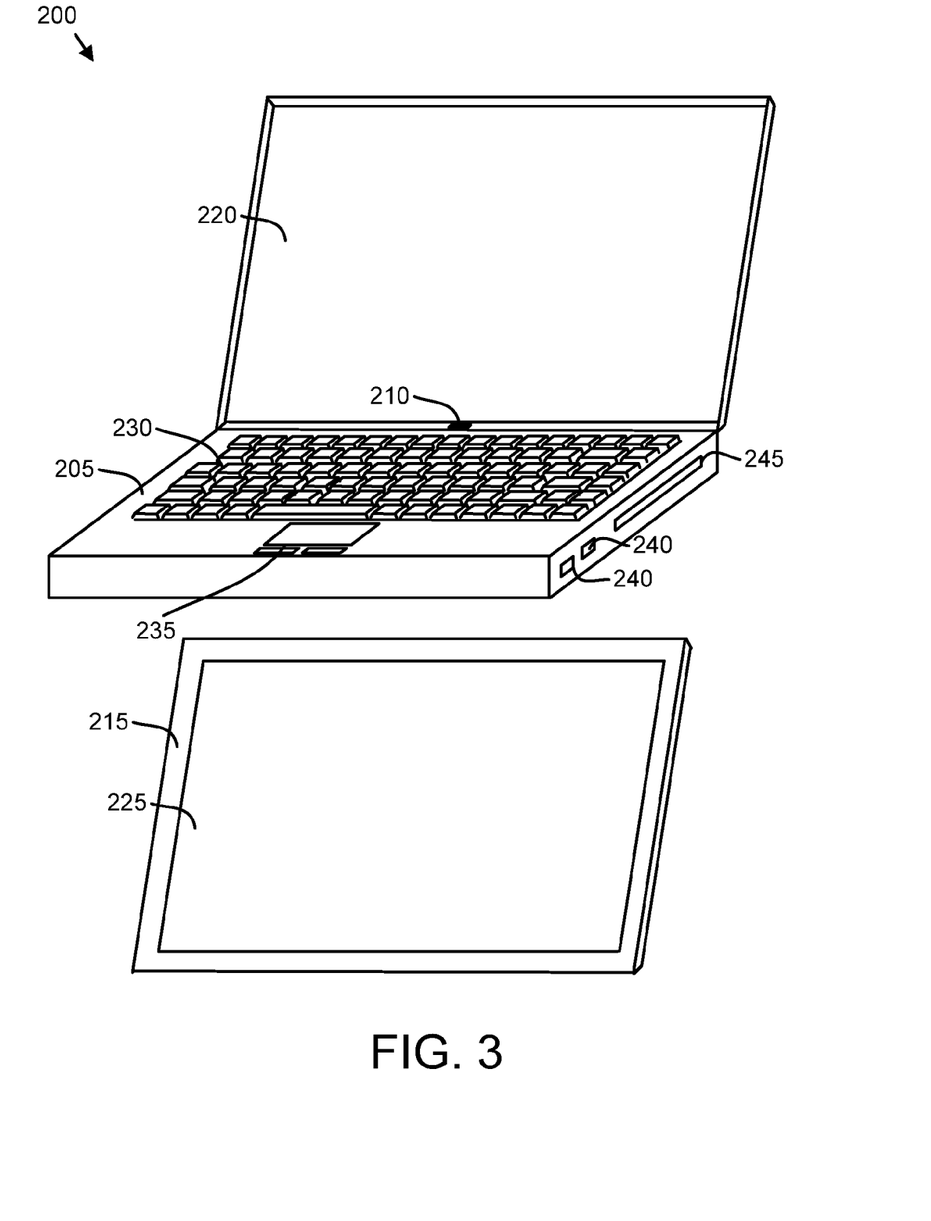
FIG. 3 is a perspective drawing illustrating one embodiment of a computer system.

FIG. 3 is a perspective drawing illustrating one embodiment of a computer system 200. The computer system 200 of FIG. 2 is shown with the detachable device 215 disconnected from the base 205. In one embodiment, the detachable device 215 connects to the base 205 through a connector 210. The description of the computer system 200 refers to elements of FIGS. 1-2, like numbers referring to like elements.

The connector 210 may be a USB connection. In an alternate embodiment, the connector 210 employs USB compliant signals through a custom connector. In addition, the connector may be a 1394 connector, a HDMI connector, and the like. In a certain embodiment, the connector 210 employs a custom interface. When the detachable device 215 is connected to the base 205, a support 220 may support the physical connection between the base 205 and a detachable device 215.

Figure 4:
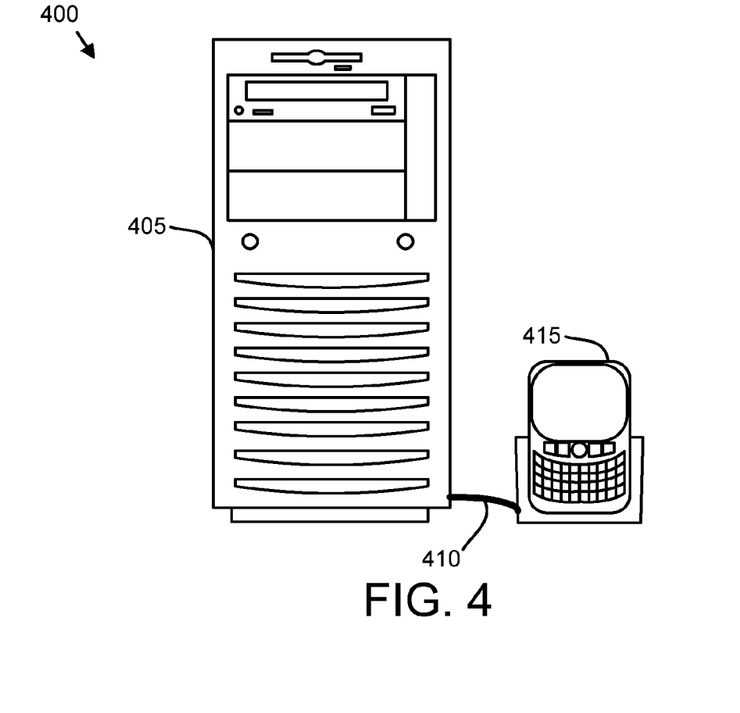
FIG. 4 is a front view drawing illustrating one alternate embodiment of a computer system.

FIG. 4 is a front view drawing illustrating one alternate embodiment of a computer system 400. The computer system 400 illustrates one embodiment of the computer system 100 of FIG. 1. The description of the computer system 400 refers to elements of FIGS. 1-3, like numbers referring to like elements.

The base 105 is depicted as a computer tower 405. The detachable device 115 is depicted as a cellular telephone 415. The connection 110 is depicted as a cable 410 such as a USB cable. One of skill in the art will recognize that the embodiments may be practiced with other combinations of devices. The detachable device 415 may provide a display and/or a network connection for the base 405.

Figure 5:
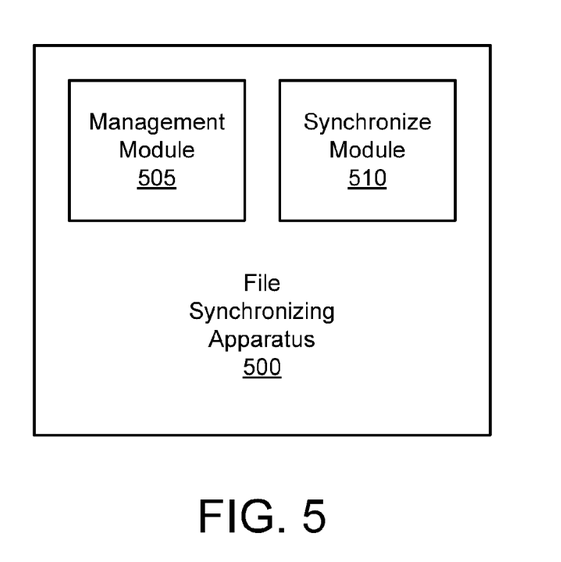
FIG. 5 is a schematic block diagram illustrating one embodiment of a file synchronizing apparatus.

FIG. 5 is a schematic block diagram illustrating one embodiment of a file synchronizing apparatus 500. The apparatus 500 may be embodied in the base 105 and the detachable device 115 of FIG. 1. The description of the apparatus 500 refers to elements of FIGS. 1-4, like numbers referring to like elements. The apparatus 500 includes a management module 505 and a synchronize module 510. The management module 505 and the synchronize module 510 may comprise a computer readable storage medium storing computer readable program code executed by a processor and/or a hardware circuit.

The management module 505 selects a file to synchronize between the base 105 and the detachable device 115. In one embodiment, the management module 505 selects a plurality of files. As used herein, the term file refers to an organization of data. The file may be physical memory locations, a data structure with data and metadata, or the like.

The synchronize module 510 establishes a control connection and a data connection between the base and the detachable device. In addition, the synchronize module 510 may transmit the file to a memory space over the data connection in response to a command communicated over the control connection. The memory space may reside on the detachable device 115. In one embodiment, the memory space is not addressable by the base 105.

Figure 6:
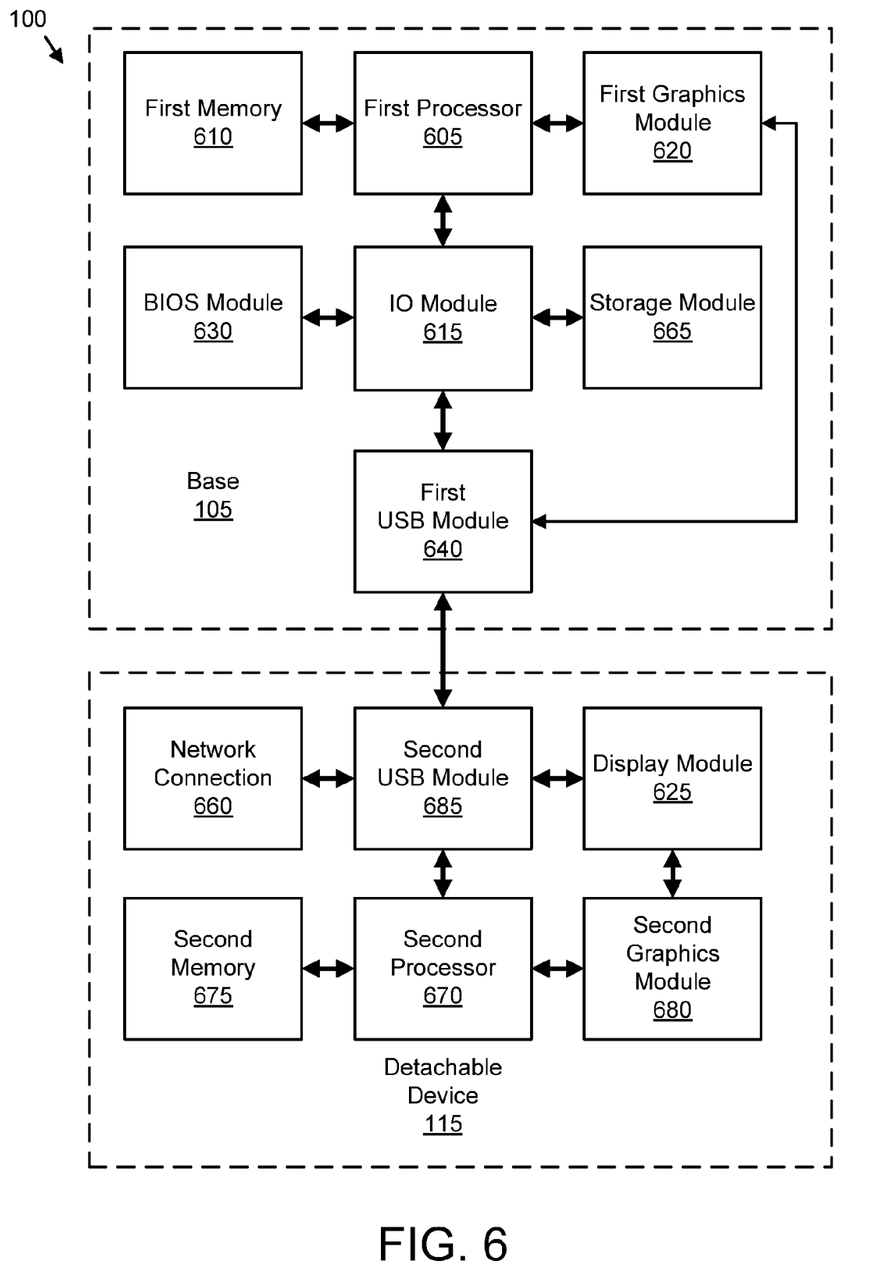
FIG. 6 is a schematic block diagram illustrating one embodiment of a base and a detachable device.

FIG. 6 is a schematic block diagram illustrating one embodiment of a base 105 and detachable device 115 of the computing system 100. The description of the base 105 and the detachable device 115 refers to elements of FIGS. 1-5, like numbers referring to like elements. The base 105 includes a first processor 605, a first memory 610, a first IO module 615, a first graphics module 620, a basic input/output system (BIOS) module 630, a first USB module 640, and a storage module 655. The detachable device 115 includes a second processor 670, a second memory 675, a second graphics module 680, a display module 625, a network connection 660, and a second USB module 685. One of skill in the art will recognize that other configurations of the computer system 100 may be employed with the embodiments described herein.

The first processor 605, first memory 610, first IO module 615, first graphics module 620, BIOS module 630, first USB module 640, second processor 670, second memory 675, second graphics module 680, display module 625, network connection 660, and second USB module 685, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The first USB module 640 may be the base connection 110a of FIG. 1. The second USB module 685 may be the detachable device connection 110b of FIG. 1. The base 105 and detachable device 115 may communicate through the first and second USB modules 640, 685.

The first memory 610 stores computer readable programs. The first memory 610 may include Dynamic Random Access Memory (DRAM), Flash memory, or the like. The first processor 605 executes the computer readable programs as is well known to those skilled in the art. The computer readable programs may be tangibly stored in the storage module 655. The storage module 655 may comprise at least one Solid State Device (SSD). In addition, the storage module 655 may include a hard disk drive, an optical storage device, a holographic storage device, a micromechanical storage device, or the like.

The first processor 605 may include an integrated cache to reduce the average time to access the first memory 610. The integrated cache may store copies of instructions and data from the most frequently used first memory 610 locations. The first processor 605 may communicate with the first memory 610 and the first graphics module 620. In one embodiment, the first processor 605 issues display commands and display data to the first graphics module 620 and the first graphics module 620 may generate rendering data for the display module 625.

In addition, the first processor 605 may communicate with the IO module 615. The IO module 625 may support and communicate with the BIOS module 630, a Peripheral Component Interconnect (PCI) bus, a Wi-Fi interface, and the like.

The BIOS module 630 may communicate instructions through the IO module 615 to boot the base 105, so that the computer readable program stored on the storage module 655 can load, execute, and assume control of the base 105. Alternatively, the BIOS module 630 may comprise a coded program embedded on a chipset that recognizes and controls various devices that make up the base 105.

The display module 625 may include the display 225 as well as additional hardware to for example decode touch inputs. When the detachable device 115 is connected to the base 105, the first graphics module 620 may communicate with the display module 625 through the first and second USB modules 640, 685. Thus the first graphics module 620 may drive the display 225 and receive inputs from the display 225.

The second memory 675 stores computer readable programs. The second memory 675 may comprise non-volatile memory devices such as Flash memory. The second processor 670 executes the computer readable programs. In one embodiment, the second processor 670 issues display commands and display data to the second graphics module 680 and the second graphics module 680 may generate rendering data for the display module 625.

In one embodiment, the detachable device 115 includes a network connection 660. The network connection 660 may communicate with a network. In one embodiment, the network is a Network Driver Interface Specification (NDIS) compliant network. In a certain embodiment, the network is a Remote NDIS (RNDIS) network. In an alternate embodiment the network is a Wireless WAN. The base 105 may communicate with the network through the network connection 660 via the first and second USB modules 640, 685.

In one embodiment, an instruction set of the first processor 605 is incompatible with an instruction set of the second processor 670. The first processor 605 may be based on an X86 instruction set and the second processor 670 may be based on an ARM instruction set.

In one embodiment, the first processor 605 and the second processor 670 may each execute a separate operating system. The first processor 605 may execute a first operating system. The first operating system may be a personal computer operating system such as a MICROSOFT WINDOWS® compatible operating system, an APPLE MACINTOSH® compatible operating system, a Linux compatible operating system, or the like. The second processor 670 may execute a second operating system. The second operating system may be a cellular telephone operating system such as an operating system based on the ANDROID® Platform Architecture, a MICROSOFT WINDOWS® compatible mobile operating system, or the like.

Figure 7:
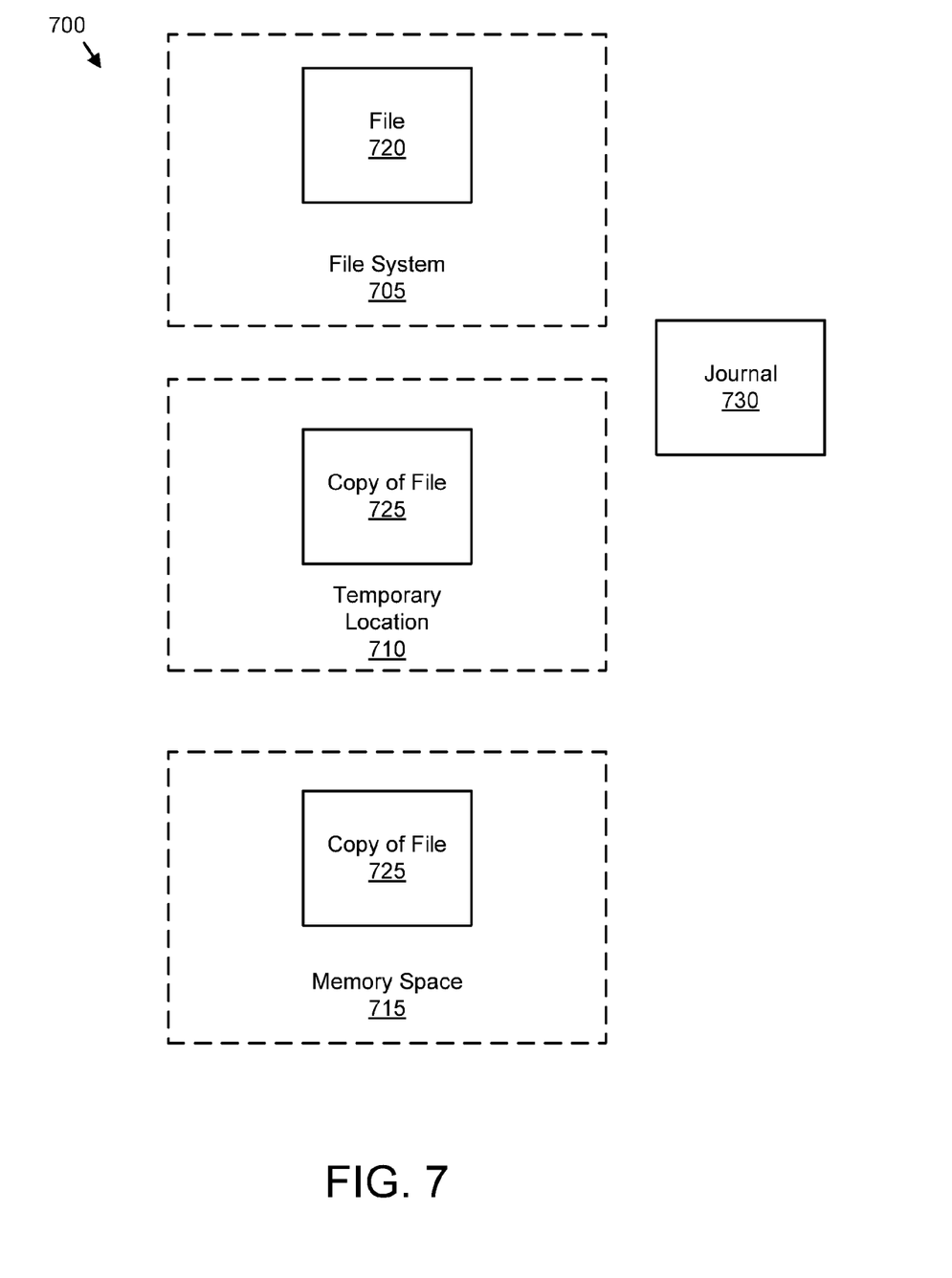
FIG. 7 is a schematic block diagram illustrating one embodiment of memory locations.

FIG. 7 is a schematic block diagram illustrating one embodiment of memory locations 700. The memory locations 700 may reside on the base 105 and the detachable device 115 and store a file. The description of the memory locations 700 refers to elements of FIGS. 1-6, like numbers referring to like elements. The memory locations 700 include a file system 705, a temporary location 710, and a memory space 715.

The file system 705 may reside on the base 105. The file system 705 may be managed by the first operating system. In one embodiment, the file system 705 may be stored in the first memory 610 and/or the storage module 665.

The temporary location 710 and the memory space 715 may reside on the detachable device 115. In one embodiment, the temporary location 710 and the memory space 715 are managed by the second operating system. The temporary location 710 and the memory space 715 may comprise allocated memory locations on the second memory 675. In one embodiment, the temporary location 710 is incorporated in the memory space 715. In an alternate embodiment, the temporary location 710 resides on the base 105 and the temporary location 710 may be incorporated in the file system 705.

The file 720 may originally reside in the file system 705. For example, the file 720 may be an audio file stored on a hard disk drive of the base 105 and organized by a MICROSOFT WINDOWS® architecture operating system. In one embodiment, the synchronize module 510 transmits the file 720 from the file system 705 to the memory space 715 over the data connection so that a copy of the file or file copy 725 resides in the memory space 715. In an alternate embodiment, the synchronize module 510 transmits the file 720 from the file system 705 to the temporary location 710 over the data connection so that the file copy 25 resides in the temporary location 710.

In an alternate embodiment, the file copy 725 is transmitted from the memory space 715 to the file system 705 as the file 720. In a certain embodiment, the file copy 725 is transmitted from the memory space 715 to the temporary space 710 residing on the base 105. The synchronize module 510 may copy the file copy 725 to the file system 705 as the file 720 in response to verifying the transmission of the file copy 725.

The management module 505 may track each change to the file 720 and/or the file copy 725 in a journal 730. The journal 730 may be organized as a data store of changes to the file 720 and/or file copy 725 and include a change description and a timestamp for each change. In one embodiment, entries to the journal 730 are employed to roll back changes to the file 720 and/or file copy 725. In a certain embodiment, the entries to the journal 730 are used to roll back uncompleted changes to the file 720 and/or file copy 725. For example, an uncompleted transmission of the file 720 to the file copy 725 may be rolled back to the condition at the beginning of the transmission.

Figure 8:
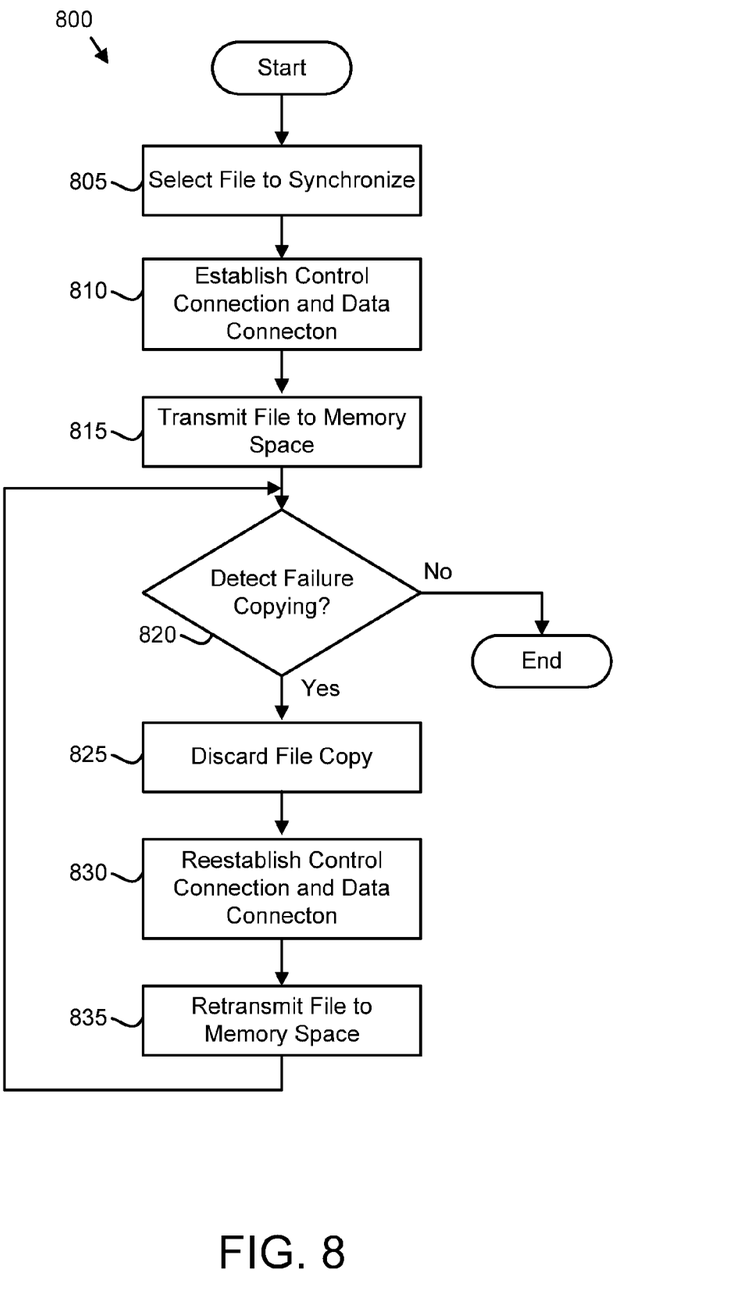
FIG. 8 is a schematic flow chart diagram illustrating one embodiment of a file synchronizing method.

FIG. 8 is a schematic flow chart diagram illustrating one embodiment of a file synchronizing method 800. The method 800 may perform the functions of the apparatus 500 of FIG. 5. The description of the method 800 refers to elements of FIGS. 1-7, like numbers referring to like elements.

The method 800 starts, and one embodiment, the management module 505 selects 805 a file 720 to synchronize between the base 105 and the detachable device 115. In one embodiment, the management module 505 scans the memory space 715 and stores a listing of files of the memory space 720 into a file database. The management module 505 may further compare the file database with files 720 in the file system 705.

In one embodiment, the management module 505 may select a latest instance of a file 720 and synchronize the latest instance of the file 720 to the other device. For example, if the base 105 stores the latest instance of the file 720 in the file system 705 while the detachable device stores an earlier instance of the file 720 as the file copy 725, the management module 505 may select the file 720 stored on the base 105 to synchronize from the base 105 to the detachable device 115.

Alternatively, if the file copy 725 stored in the memory space 715 is modified by the detachable device 115 so that the file copy 725 is the latest instance of the file 720, the management module 505 may select the modified file copy 725 to synchronize from the detachable device 115 to the base 105.

In one embodiment, the management module 505 selects 805 the file 720 in response to a modification to the file 720. In a certain embodiment, the management module 505 selects 805 the file 720 in response to a modification of the file 722 by the file system 705. Alternatively, the management module 505 may select 805 the file copy 725 in response to a modification of the file copy 725 by the detachable device 115.

In an alternate embodiment, the management module 505 selects 805 a plurality of files 720 after an update to the file system 705. The plurality of files 720 may include all files 720 in the file system 705. In addition, the management module 505 may select a directory and dependent sub-directories. The management module 505 may also select 805 a plurality of file copies 725 stored in the memory space 715 after an update to the file database. The plurality of file copies 725 may include all file copies 725 stored in the memory space 715.

The synchronize module 510 establishes 810 the control connection and the data connection between the base 105 and detachable device 115. The control connection may be an out-of-band connection distinct from the data connection. The data of the file 720 may be communicated through the data connection and administration commands may be communicated through the control connection.

In one embodiment, the synchronize module 510 may establish a first base port on the base 105 and a first device port on the detachable device 115. The control connection may communicate through the first base port and the connection 110 to the first device port. In addition, the synchronize module 510 may establish a second base port on the base 105 and a second device port on the detachable device 115. The data connection may communicate through the second base port and the connection 110 to the second device port. The first base port, second base port, first device port, and second device port may be logical ports.

In one embodiment, communications over the control connection and the data connection conform to a File Transfer Protocol (FTP) standard. The communications may conform to Request for Comments (RFC) 959 of the Internet Engineering Task Force (IETF). In one embodiment the first device port is port 21 and the second device port is port 20 on the detachable device 115. Alternatively, the first base port may be port 21 and the second device port may be port 20 on the base 105.

In one embodiment, the communications are FTP passive mode communications. Alternatively, the communications are FTP active mode communications. In a certain embodiment, the communications are FTP image mode communications. Alternatively, the communications are FTP local mode communications.

The synchronize module 510 transmits 815 the file 720 to the memory space 715 over the data connection in response to at least one command communicated over the control connection. In an alternate embodiment, the synchronize module 510 may delete, rename, and/or move the file 720 and/or file copy 735. In a certain embodiment, the synchronize module 510 changes permissions and/or metadata for the file 720 and/or file copy 735. In one embodiment, the memory space 715 receives the transmitted file 720 as the file copy 725 in the temporary location 710 and copies the file copy 725 to a final location in the memory space 715 in response to verifying the transmission.

In one embodiment, the memory space 715 receives the transmitted file 720 as the file copy 725 in a final location of the memory space 715 with a temporary file name assigned to the file copy 725. The synchronize module 810 may assign a final name to the file copy 725 in response to verifying the transmission. The final name may be the name of the file 720. The management module 505 may track each change to the file 720 and/or each file copy 725 in the journal 730.

The memory space 715 may receive the transmitted file 720 as a plurality of blocks and assembles the plurality of blocks as the file copy 725 in a final location in response to verifying the transmission. The plurality of blocks may be stored in the temporary location 710.

In one embodiment, the synchronize module 510 detects 820 a failure transmitting the file 720 to the file copy 725 in the memory space 715. The synchronize module 510 may detect 820 the failure if the receiving device fails to return an acknowledgement signal. Alternatively, the synchronize module 510 may detect 820 the failure transmitting the file 720 to the file copy 725 in the memory space 715 by detecting the detachable device 115 disconnecting from the base 105 during the transmission 815 of the file 720. In a certain embodiment, the synchronize module 510 detects 820 the failure transmitting the file 720 to the file copy 725 in a memory space 715 by comparing a cyclic redundancy check (CRC) value of the file copy 725 with an expected CRC value.

If the synchronize module 510 does not detect 820 a failure transmitting, the method 800 ends. In one embodiment, if the synchronize module 510 does not detect 820 a failure transmitting, the transmission is verified.

If the synchronize module 510 detects 820 a failure transmitting the file 720 to the file copy 725 in the memory space 715, the management module 510 discards 825 the file copy 725. In one embodiment, the management module 510 discards 825 the file copy 725 by deleting the file copy 725. In an alternate embodiment, the management module 510 discards 825 the file copy 725 by marking the file copy 725 as a partial copy. When marked as a partial copy, the base 105 and/or the detachable device 115 may not access the file copy 725.

In one embodiment, the management module 510 reestablishes 830 the control connection and the data connection between the base 105 and detachable device 115. The management module 510 may reestablish 830 the control connection and the data connection in response to detecting the reconnection of the detachable device 115 to the base 105.

In addition, the synchronize module 510 may retransmit 835 the file 720 to the memory space 715 over the data connection in response to reestablishing the control connection and the data connection. In one embodiment, the synchronize module 510 continues the transmission of the file 720 if the file copy 725 is marked as a partial copy. For example, the synchronize module 510 may determine what portion of the file 720 is included in the file copy 725 and transmit the portion of the file 720 that the file copy 725 lacks. The synchronize module 510 may then assemble the partial file copy 725 with the retransmitted portion of the file 720 to form a complete file copy 725. In addition, the synchronize module 510 may detect 820 a failure retransmitting the file 720 to the file copy 725 in a memory space 715.

By detecting 820 the failure transmitting the file 720, the method 800 mitigates the failed transmission. Thus the memory space 715 and/or file system 705 does not include and employ partial, corrupted files 720 and file copies 725. In addition, the method 800 may retransmit 835 the file 720 in response to a failure when the base 105 and the detachable device 115 are reconnected.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a management module selecting a file to synchronize between a base and a detachable device and tracking a change to the file in a journal with a change description and time stamp, the detachable device providing a display and a network connection for the base if the base and detachable device are connected, the base not having a network connection and only communicating with a network through the network connection of the detachable device;
    a synchronize module establishing a File Transfer Protocol (FTP) control connection and a FTP data connection between the base and the detachable device and transmitting the file to a memory space over the FTP data connection in response to a command communicated over the FTP control connection, wherein the memory space resides on the detachable device and is not addressable by the base;
    in response to receiving an acknowledgement signal, the synchronization module further receiving the file copy with a temporary file name at the memory space, and assigning a final file name to the file copy; and
    in response to detecting a failure transmitting the file, the synchronization module further marking the file copy as a partial copy, reestablishing the FTP control connection and the FTP data connection between the base and the detachable device, retransmitting a portion of the file that the file copy lacks, and assembling the file copy from the partial copy and the retransmitted portion of the file to form complete the file copy.

2. The apparatus of claim 1, wherein the memory space receives the transmitted file copy to a temporary location and copies the file copy to a final location in response to verifying the transmission.

3. The apparatus of claim 1, wherein the memory space receives the transmitted file copy to a final location with the temporary file name assigned to the transmitted file copy and assigns the final name to the file copy in response to verifying the transmission.

4. The apparatus of claim 1, wherein the memory space receives the transmitted file copy as a plurality of blocks and assembles the plurality of blocks to a final location in response to verifying the transmission.

5. The apparatus of claim 1, wherein the detachable device receives the transmitted file copy to a temporary memory and copies the file copy to the memory space in response to verifying the transmission.

6. The apparatus of claim 1, the synchronization module further retransmitting the portion of the file in response to the file copy being marked as a partial copy and determining the portion of the file that the file copy lacks.

7. A method comprising:
    selecting a file to synchronize between a base and a detachable device, the detachable device providing a display and a network connection for the base if the base and detachable device are connected, the base not having a network connection and only communicating with a network through the network connection of the detachable device;
    tracking a change to the file in a journal with a change description and time stamp;
    establishing a File Transfer Protocol (FTP) control connection and a FTP data connection between the base and the detachable device; and
    transmitting the file to a memory space over the FTP data connection in response to a command communicated over the FTP control connection, wherein the memory space resides on the detachable device and is not addressable by the base;
    in response to receiving an acknowledgement signal, receiving the file copy with a temporary file name at the memory space, and assigning a final file name to the file copy; and
    in response to detecting a failure transmitting the file, marking the file copy as a partial copy, reestablishing the FTP control connection and the FTP data connection between the base and the detachable device, retransmitting a portion of the file that the file copy lacks, and assembling the file copy from the partial copy and the retransmitted portion of the file to form complete the file copy.

8. The method of claim 7, the method further comprising discarding the file copy in the memory space in response to detecting the failure transmitting the file to the file copy.

9. The method of claim 7, the method further comprising scanning the memory space and storing a listing of files of the memory space in a database.

10. The method of claim 7, wherein the file is transmitted to the memory space in response to a modification to the file.

11. The method of claim 7, wherein the file is transmitted to the memory space in response to an addition of the file to a file system.

12. The method of claim 7, wherein a plurality of selected files are transmitted to the memory space after an update to a file system.

13. The method of claim 7 the method retransmitting the portion of the file in response to the file copy being marked as a partial copy and the method further comprising determining the portion of the file that the file copy lacks.

14. A computer program product comprising a non-transitory computer readable storage medium storing computer readable program code executed by a processor to perform operations for synchronizing files, the operations of the computer program product comprising:
    selecting a file to synchronize between a base and a detachable device, the detachable device providing a display and a network connection for the base if the base and detachable device are connected, the base not having a network connection and only communicating with a network through the network connection of the detachable device;
    tracking a change to the file in a journal with a change description and time stamp;
    establishing a File Transfer Protocol (FTP) control connection and a FTP data connection between the base and the detachable device; and
    transmitting the file to a memory space over the FTP data connection in response to a command communicated over the FTP control connection, wherein the memory space resides on the detachable device and is not addressable by the base;

in response to receiving an acknowledgement signal, receiving the file copy with a temporary file name at the memory space, and assigning a final file name to the file copy; and in response to detecting a failure transmitting the file, marking the file copy as a partial copy, reestablishing the FTP control connection and the FTP data connection between the base and the detachable device, retransmitting a portion of the file that the file copy lacks, and assembling the file copy from the partial copy and the retransmitted portion of the file to form complete the file copy.

15. The computer program product of claim 14, wherein the memory space receives the transmitted file copy to a final location with the temporary file name assigned to the transmitted file copy and assigns the final name to the file copy in response to verifying the transmission.

16. The computer program product of claim 14, the operations further comprising discarding the file copy in the memory space in response to detecting the failure transmitting the file to the file copy.

17. The computer program product of claim 14 the operations retransmitting the portion of the file in response to the file copy being marked as a partial copy and the operations further determining the portion of the file that the file copy lacks.

* * * * *